(12) United States Patent
Zhou

(10) Patent No.: US 9,691,427 B2
(45) Date of Patent: Jun. 27, 2017

(54) METHOD AND APPARATUS FOR DETECTING TIGHTNESS OF A PICK-UP HEAD, METHOD FOR CONTROLLING THE MOVING OF THE PICK-UP HEAD

(71) Applicant: AutoChips Inc., Hefei Anhui (CN)

(72) Inventor: Jian Zhou, Hefei Anhui (CN)

(73) Assignee: AutoChips Inc., Hefei, Anhui (CN)

( * ) Notice: Subject to any disclaimer, the term of this patent is extended or adjusted under 35 U.S.C. 154(b) by 0 days.

(21) Appl. No.: 15/220,734

(22) Filed: Jul. 27, 2016

(65) Prior Publication Data

US 2017/0032818 A1 Feb. 2, 2017

(30) Foreign Application Priority Data

Jul. 30, 2015 (CN) .......................... 2015 1 0468827

(51) Int. Cl.
| | |
|---|---|
| *G11B 7/00* | (2006.01) |
| *G11B 19/00* | (2006.01) |
| *G11B 21/08* | (2006.01) |
| *G11B 5/455* | (2006.01) |

(52) U.S. Cl.
CPC .................................... *G11B 21/08* (2013.01)

(58) Field of Classification Search
CPC .............. G11B 7/08505; G11B 27/105; G11B 27/3027; G11B 7/08529; G11B 7/08527; G11B 19/02; G11B 7/0945; G11B 7/08511; G11B 7/0956; G11B 7/0941; G11B 19/26; G11B 2220/20; G11B 19/04; G11B 220/2545; G11B 3/00; G11B 3/38

USPC ........... 369/30.1, 30.17, 30.24, 30.36, 44.27, 369/44.32, 47.36, 47.39, 53.1, 53.18, 369/53.37, 53.47, 53.38

See application file for complete search history.

(56) References Cited

U.S. PATENT DOCUMENTS 7,965,460 B2 * 6/2011 Elliott .................. G11B 19/042
324/212

* cited by examiner

*Primary Examiner* — Nabil Hindi
(74) *Attorney, Agent, or Firm* — Klein, O'Neill & Singh, LLP

(57) ABSTRACT

A method and apparatus for detecting tightness of a pick-up head, and a method and apparatus for controlling the moving of the pick-up head are disclosed. The method for detecting the tightness of the pick-up head includes moving the pick-up head to an inner area of the disc reading device when then disc reading device is powered on, moving the pick-up head to an outer area of the disc reading device within a predetermined time period, moving the pick-up head from the outer area of the disc reading device to the inner area at a constant speed by a first fixed force, and recording the moving duration for moving the pick-up head from the outer area of the disc reading device to the inner area at the constant speed.

20 Claims, 4 Drawing Sheets

METHOD AND APPARATUS FOR DETECTING TIGHTNESS OF A PICK-UP HEAD, METHOD FOR CONTROLLING THE MOVING OF THE PICK-UP HEAD

CROSS-REFERENCE TO RELATED APPLICATIONS

This application is based upon and claims the benefit of priority from the prior Chinese Patent Application No. 201510468827.X, filed on Jul. 30, 2015, the entire contents of which are incorporated herein by reference.

FIELD OF THE DISCLOSURE

The present disclosure relates to the field of DVD reading, and more particularly, to a method and an apparatus for detecting tightness of a pick-up head, and a method for controlling the movement of the pick-up head.

BACKGROUND OF THE DISCLOSURE

Servo disc-reading is an important function with extensive applications. Specifically, it can be applied in disc navigators, household disc players, and disc players in computers.

Generally, a servo reading module comprises a servo control module, a pick-up head and a disc mechanism. The pick-up head is movably assembled along sliding rails of the mechanism while the servo reading module is operating to read information at different positions of the disc under control of the servo control module. During the developing process, the developer may set up a group of forces for controlling the motion of the pick-up head based on coordination of the pick-up head and the mechanism, and burn the group of forces into the servo control module to perform the disc reading function.

During fabrication, process differences might result in different spacing between the sliding rails along portions or an entire length of the sliding rails, which can affect the velocity of the pick-up head moving along the sliding rails. Said differently, the different spacing between the sliding rails can cause different regions of tightness or binding, which could lead to different pick-up head speeds when the pick-up head moves along the sliding rails under a same force. Furthermore, the difference in spacing between the sliding rails can vary from one disc reading system to another. In practical applications, however, with respect to mechanisms of the same type, mechanisms produced by different manufacturers may have different tightness, and even the same mechanism manufacturer may also produce mechanisms with different tightness due to product-line management issues.

SUMMARY OF THE DISCLOSURE

An aspect of the present disclosure provides a method and an apparatus for detecting tightness of a pick-up head, and a method and an apparatus for controlling the movement of the pick-up head, which are capable of effectively detecting the tightness of the pick-up head.

Another aspect of the present disclosure provides a method for detecting tightness of a pick-up head, wherein the method comprises moving the pick-up head to an inner area of a disc reading device when the disc reading device is powered on, moving the pick-up head to an outer area of the disc reading device within a predetermined time period, moving the pick-up head from the outer area of the disc reading device to the inner area at a constant speed by a first fixed force, and recording the duration of moving the pick-up head from the outer area of the disc reading device to the inner area at the constant speed.

Yet another aspect of the present disclosure provides a method for controlling the movement of a pick-up head, wherein the method comprises moving, by a disc reading device, the pick-up head outward from an inner area of the disc reading device by a first fixed force within a first time period, moving the pick-up head outward by a second fixed force within a second time period, wherein the second fixed force is smaller than the first force, and moving, by means of a PWM, the pick-up head outward by a third fixed force within a third time period, so as to move the pick-up head to the outer area of the disc reading device, wherein the third fixed force is smaller than the second force. A summation of the first time period, the second time period, and the third time period is equal to a predetermined time period.

Still yet another aspect of the present disclosure provides an apparatus for detecting tightness of a laser head. The apparatus comprises a servo control module and a processing module. The servo control module is configured to control the pick-up head to move to an inner area of a disc reading device when the disc reading device is powered on, control the pick-up head to move to an outer area of the disc reading device within a predetermined time period, and control the pick-up head to move from the outer area of the disc reading device to the inner area at a constant speed by a first fixed force. The processing module is configured to record the duration of moving the pick-up head from the outer area of the disc reading device to the inner area at the constant speed.

One aspect of the present disclosure provides an apparatus for controlling the moving of a pick-up head, wherein the apparatus comprise a servo control module configured to control the pick-up head by a first fixed force to move outward from an inner area of a disc reading device within a first time period. The servo control module is further configured to control the pick-up head by a second fixed force to move outward within a second time period, wherein the second fixed force is smaller than the first fixed force. The servo control module is further configured to control, by means of a PWM, the pick-up head by a third fixed force to move outward within a third time period, so as to control the pick-up head to move to an outer area of the disc reading device, wherein the third fixed force is smaller than the second fixed force. A summation of the first time period, the second time period, and the third time period is equal to a predetermined time period.

Another aspect of the present disclosure can detect the tightness of the pick-up head through the recorded moving duration, thus improving the accuracy of the parameters of the disc reading device, and providing reference for subsequent use of the disc reading device.

DETAILED DESCRIPTION

The detailed description set forth below in connection with the appended drawings is intended as a description of the presently preferred embodiments in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features. Certain terms may be used throughout the description to refer to particular components. It is appreciated for persons skilled in the art, manufacturers may refer to a component by different names. This document does not intend to distinguish between components by name but by function. Throughout the description, the terms "including" and "comprising" are used in an open-ended fashion, and thus should be interpreted to mean "including, but not limited to . . . ". The terms "couple" and "couples" are intended to mean either a direct or an indirect connection, hence, if a first device couples to a second device, that connection may be through a direct connection, or through an indirect connection via other devices and connections.

In one embodiment of the present disclosure, the moving duration in which the pick-up head travels between an outer area and an inner area of the disc reading device can be recorded to detect the tightness of the disc reading device. For example, the moving duration in which the pick-up head can complete a full travel between the outer area and inner area of the disc reading device with a constant speed when the disc reading device is powered on is recorded to detect the tightness of the disc reading device. A limit switch can be disposed at the inner area of the disc reading device to determine whether or not the pick-up head has reached the inner area position. Hence, the pick-up head needs to move to the outer area of the disc reading device before moving to the inner area at a constant speed. The state of the limit switch may be utilized to determine whether the pick-up head has reached the inner area, so as to record the moving duration for moving the pick-up head from the outer area to the inner area, to detect the tightness of the pick-up head based on the recorded time.

Figure 1:
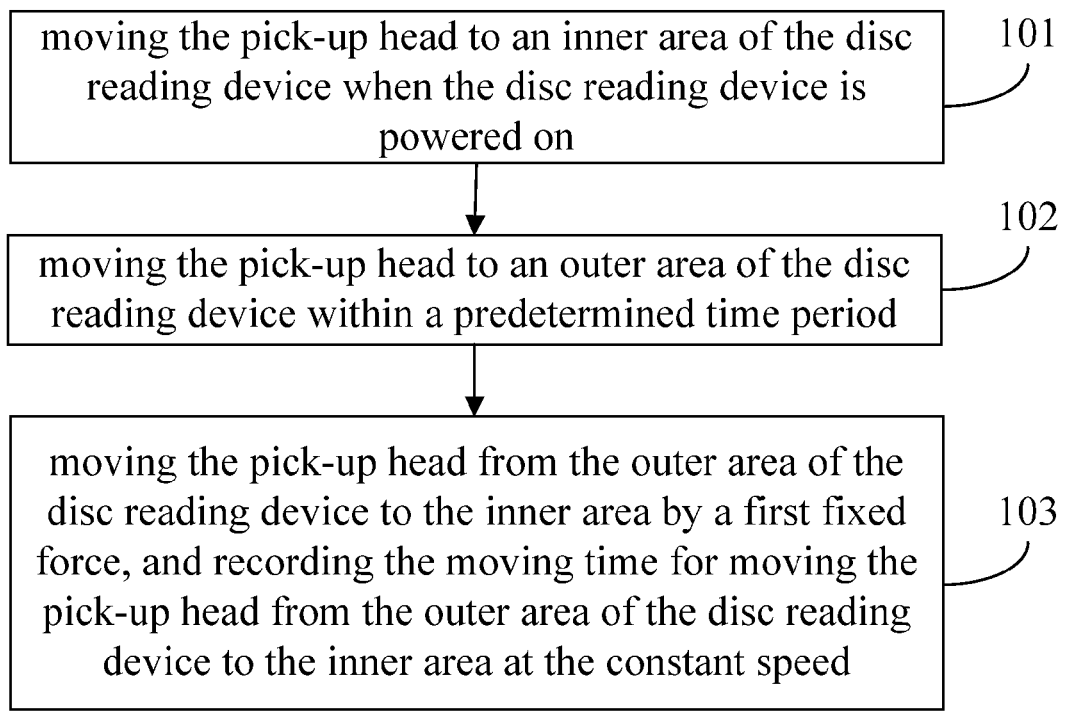
FIG. 1 is a flow chart illustrating a method for detecting tightness of a pick-up head according to an embodiment of the present disclosure.

FIG. 1 shows a flow chart illustrating a method for detecting tightness of a pick-up head according to an exemplary embodiment of the present disclosure. The method begins in block 101 by moving the pick-up head to an inner area of a disc reading device when the disc reading device is powered on.

The disc reading device may have a limit switch only at the inner area of the sliding rail, in which case the limit switch may be used to accurately determine whether or not the pick-up head has moved to the inner area. In order to accurately detect the tightness of the pick-up head of the disc reading device, according to this embodiment, the state of the limit switch may be utilized to first determine whether the pick-up head is located at the inner area of the disc reading device when the disc reading device is powered on. Since the outer area of the disc reading device is not equipped with a limit switch and it is unable to determine whether the pick-up head is accurately located at the outermost circle, the pick-up head should move to the inner area first. Hence, in this embodiment, the inner area of the disc reading device is chosen as an initial position for moving the pick-up head, and the pick-up head may then accurately move to the outer area of the disc reading device in a subsequent step 102. More specifically, when the pick-up head does not reach the limit switch, the state of the limit switch is represented by "1", and when the pick-up head reaches the limit switch, that is, the pick-up head moves to the inner area, the state of the limit switch would be switched from "1" to "0". When the pick-up head is determined not to be located at the inner area by the state of the limit switch, the pick-up head would be moved to the inner area of the disc reading device.

It should be noted that, in the above embodiment, the current block 101 is performed only when the disc reading device is powered on, and would not be performed under other conditions such as, when the disc is entering or taken out of the tray, or when the system is awakened from a sleep state to a wake-up state.

In block 102, the pick-up head moves to the outer area of the disc reading device within a predetermined time period.

Since the disc reading device only has the limit switch disposed at the inner area and not at the outer area, the pick-up head would first move to the inner area of the disc reading device, before moving to the outer area within a predetermined constant time period. The predetermined constant time period should be sufficient enough to ensure the pick-up head moves from the inner area of the disc reading device to the outer area, and not too long to affect user experience.

In block 103, the pick-up head moves from the outer area of the disc reading device to the inner area at a constant speed by a first fixed force, and the moving duration for moving the pick-up head from the outer area of the disc reading device to the inner area at the constant speed is recorded.

When the pick-up head moves to the outer area of the disc reading device, a first fixed force may be applied to control the pick-up head to move at a constant speed from the outer area of the disc reading device to the inner area, the limit switch disposed at the inner area may further be utilized to determine whether the pick-up head has reached the inner area position, and the time for moving the pick-up head uniformly from the outer area to the inner area would be recorded. Hence, the tightness of the pick-up head may be detected based on the recorded moving duration, thus improving the precision of parameters of the disc reading device, and also providing reference for subsequent use of the disc reading device.

Differing from the prior art, in the present embodiment, the pick-up head first moves to the inner area of the disc reading device, and then moves to the outer area of the disc reading device within the predetermined time period, before moving uniformly from the outer area of the disc reading device to the inner area by a first fixed force. The moving duration for moving the pick-up head uniformly from the outer area of the disc reading device to the inner area is recorded. Hence, according to one aspect of the present disclosure, the tightness of the pick-up head can be detected based on the recorded moving duration, thus improving the precision of the parameters of the disc reading device, and providing reference for subsequent use of the disc reading device.

Figure 2:
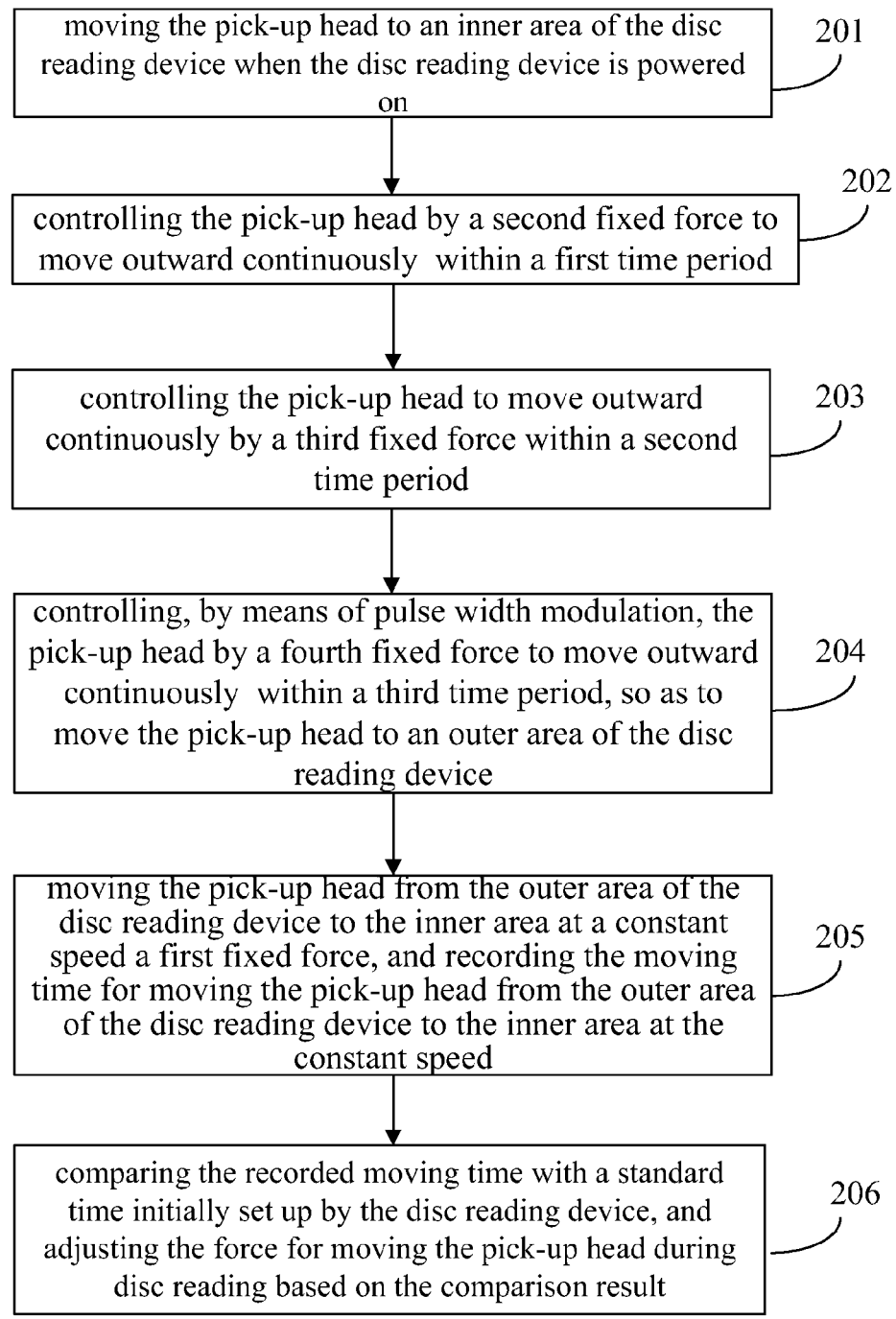
FIG. 2 is a flow chart illustrating a method for detecting tightness of a pick-up head according to another embodiment of the present disclosure.

Referring now to FIG. 2, which shows a flow chart illustrating a method for detecting the tightness of a pick-up head installment according to another embodiment of the present disclosure. The method begins in block 201 by moving the pick-up head to an inner area of a disc reading device when the disc reading device is powered on.

Specifically, moving the pick-up head to an inner area of a disc reading device when the disc reading device is powered on may comprise first determining whether the pick-up head is located at the inner area of the disc reading device through the limit switch disposed at the inner area when the disc reading device is powered on, and if not, moving the pick-up head to the inner area position of the disc reading device.

When the pick-up head has moved to the inner area of the disc reading device, the pick-up head may then move to an outer area of the disc reading device within a predetermined time period set up in advance. Moving the pick-up head to the outer area may further comprise blocks 202-204.

In block 202, the pick-up head moves outward by a second fixed force within a first time period.

Specifically, to ensure the pick-up head reaches the outer area, a second fixed force is first applied to move the pick-up head outward from the inner area for the first time period. The second fixed force may be relative larger so as to ensure that the pick-up head can move outward from the inner area of the disc reading device to a relatively long distance to be near the outer area of the disc reading device. Specifically, the product (i.e., the pick-up head's moving distance in block 202) of a moving speed corresponding to the second fixed force and the first time period should be smaller than a total length between the inner area of the disc reading device and the outer area, but should at least be larger than half of the distance between the inner area and the outer area. In actual implementations, the product of the moving speed corresponding to the second force and the first time period may be set up to be ¾ of the distance between the inner area and the outer area or even longer.

In block 203, the pick-up head moves outward by a third fixed force within a second time period, in which the third fixed force is smaller than the second fixed force.

After moving for the first time period, the pick-up head has been close to the outer area of the disc reading device. To make the pick-up head closer to the outermost circle, in block 203, the moving force applied on the pick-up head can be reduced, so as to reduce the inertia thereof. Hence, a third fixed force that is smaller than the second fixed force would be applied to move the pick-up head outward continuously for a second time period so that the pick-up head would be very close to the outer area of the disc reading device, but still does not reach the outermost circle. Specifically, the second time period is shorter than the first time period, and the third fixed force is also smaller than the second fixed force. Hence, the pick-up head's moving distance in this step would be smaller than the moving distance in block 202. In block 203, for example, the pick-up head may move to a position at ⅚ of the total length.

In block 204, the pick-up head moves, by means of pulse width modulation (PWM), outward by a fourth fixed force within a third time period, so as to move the pick-up head to the outer area of the disc reading device.

After moving for the first time period and the second time period, the pick-up head would be very close to the outer area of the disc reading device. In furthering the moving process, if the force for moving the pick-up head is too large, the pick-up head could move too fast and thus may, for example, hit the periphery of the mechanism, produce an abnormal sound, and damage the components of the disc reading device. To prevent such a situation, the pick-up head can be controlled by means of PWM in an embodiment, a fourth fixed force that is smaller than the third fixed force would be applied to move the laser outward for a third time period. Specifically, the third time period may be relatively long, and the fourth force may be relatively small. For example, the third time period may be larger than the summation of the first time period and the second time period. The pick-up head moves by means of PWM, thereby ensuring that the pick-up head can move slowly for a relatively long period of time, thus infinitely nearing the outer area without hitting the periphery of the mechanism.

In the above blocks 202-204, the summation of the first time period, the second time period and the third time period is equal to the predetermined time period as aforementioned. Specifically, after a large number of experiments and practices, a value for the predetermined time period is preferred to be about 4 seconds to about 6 seconds, such that the pick-up head can accurately move to the outer area, and the moving duration would not be too long to affect the user's experience. More preferably, the predetermined time period is 4 seconds, in which the first time period is 600 milliseconds (ms), the second time period is 400 ms, and the third time period is 3 seconds.

In block 205, the pick-up head moves from the outer area of the disc reading device to the inner area at a constant speed by a first fixed force, the moving duration for moving the pick-up head from the outer area of the disc reading device to the inner area at the constant speed is recorded.

When the pick-up head moves to the outer area of the disc reading device, a first fixed force would be applied to control the pick-up head to move with a constant speed from the outer area of the disc reading device to the inner area, and the limit switch disposed at the inner area may further be utilized to determine whether the pick-up head has reached the inner area position, so as to record the moving duration for moving the pick-up head from the outer area to the inner area accordingly.

Specifically, in the current embodiment, a timer may be used to record the moving duration in which the pick-up head moves uniformly from the outer area of the disc reading device to the inner area. For example, the timer may count once at every fixed time interval until the state of the limit switch indicates that the pick-up head has moved to the inner area of the disc reading device. The fixed time interval of the timer can be, for example, 20 ms, 10 ms, or 30 ms, and is not limited herein.

In block 206, the recorded moving duration is compared with a standard time initially set up by the disc reading device, and the force for moving the pick-up head during disc reading is adjusted according to the comparison result.

The value of the moving duration recorded in block 206 may be compared with the standard time initially set up by the disc reading device to determine the tightness of the pick-up head installment. Typically, to simplify the calculation complexity, the fixed time interval used by the timer in block 205 may be equal to the time interval used by the disc reading device for initially setting the standard time. Specifically, the standard time set by the disc reading device refers to the time required for moving the pick-up head from the outer area to the inner area (or, from the inner area to the outer area) by a standard force that is initially set by the disc reading device and used for moving the pick-up head during disc reading.

When the current tightness of the pick-up head is known, the following specific operations can be performed to adjust the moving force of the pick-up head based on the current tightness.

Firstly, a tightness rate of the pick-up head in the current situation is calculated according to the moving duration recorded by the timer and the standard time. The tightness rate is a ratio of the moving duration recorded by the timer to the standard time. Additionally, in actual applications, the ratio is generally a very small value. Hence in the current embodiment, to reduce error, the recorded moving duration may first be enlarged by a certain times and then be compared to the initial standard time to acquire the tightness rate. When adjusting the force for the pick-up head based on the tightness rate, the adjusted force may be narrowed again by the same times. In the embodiment, specifically, the moving duration will be enlarged by 8 times for example. The ratio of the recorded moving duration enlarged by 8 times to the initial reference time is taken as the tightness rate, as shown in the following equation:

Tightness rate=(Moving duration*8)/Standard time.

After the tightness rate is acquired, the force for moving the pick-up head will be adjusted based on the tightness rate. The force for moving the pick-up head is the product of the initial reference force (i.e., a standard force) and the tightness rate, as shown in the following equation:

Adjusted force=(Standard force*Tightness rate)/8.

The moving duration is enlarged by 8 times for calculating the tightness rate, namely, the current calculated tightness rate is 8 times the actual tightness rate. Therefore, the adjusted force obtained based on the above equation will be narrowed by 8 so as to acquire the actual force for moving the pick-up head.

In other embodiments, other parameters can also be utilized to reduce error, and is not limited herein.

Differing from the previous embodiment, in this embodiment it not only detects the tightness degree of the pick-up head and improves the precision of the parameters of the disc reading device, but also further adjusts the force for moving the pick-up head based on the detected tightness degree of the pick-up head and improves the matching degree of the moving force and the actual tightness rate, thus making the disc reading function more accurate and enhancing the user experience.

Figure 3:
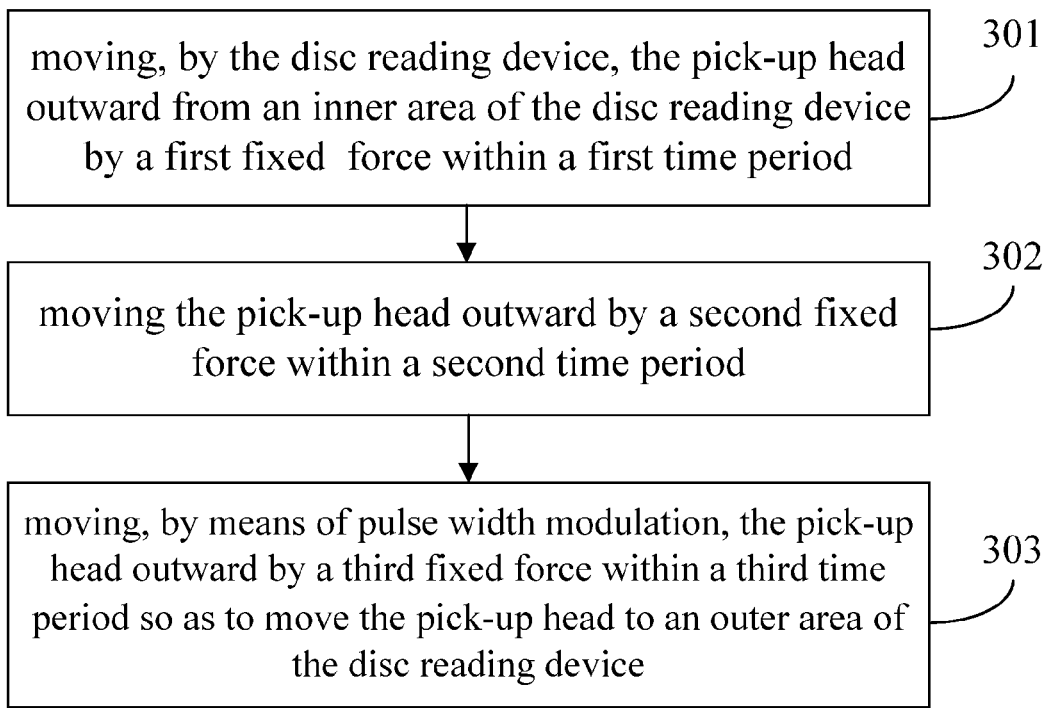
FIG. 3 is a flow chart illustrating a method for moving a pick-up head according to an embodiment of the present disclosure.

FIG. 3 shows a flow chart illustrating a method for moving a pick-up head according to an embodiment of the present disclosure. The method for moving the pick-up head according to the current embodiment comprises the following steps.

In block 301, a disc reading device moves the pick-up head outward from an inner area of the disc reading device by a first fixed force within a first time period.

Since the limit switch is disposed only at the inner area of the pick-up head's sliding rail, and not disposed at the outer area, it thus cannot be determined whether the pick-up head is located on the outer area of the disc reading device. Hence in the current embodiment, the inner area of the disc reading device will be chosen as the initial position for moving the laser head. More specifically, when the pick-up head does not touch the limit switch, the state of the limit switch is represented by "1", and when the pick-up head is moved to the inner area and touches the limit switch, the state of the limit switch would be switched from "1" to "0". When the pick-up head is determined to be not located at the inner area via the state of the limit switch, the pick-up head would be moved to the inner area of the disc reading device.

When it is determined that the pick-up head is located at the inner area of the disc reading device, the pick-up head would then move to the outer area of the disc reading device within a fixed predetermined time period that is set in advance. The predetermined time period should be sufficient enough to guarantee the pick-up head moving from the inner area of the disc reading device to the outer area, and should not be too long to affect the user experience.

Specifically, a first fixed force would be applied to move the pick-up head outward from the inner area within a first time period. The first force may be large, so as to ensure that the pick-up head can move along the sliding rail to a relatively long distance to near the outer area of the disc reading device. The product of a moving speed corresponding to the first fixed force and the first time period (i.e., the pick-up head's moving distance in block 301) should be smaller than a total length between the inner area of the disc reading device and the outer area, but should at least be larger than half of the total length. In actual implementations, the product of the moving speed corresponding to the first force and the first time period may be configured to be ¾ of the total length or even longer.

In block 302, the pick-up head moves outward by a second fixed force within a second time period.

After moving for the first time period, the pick-up head is close to the outer area of the disc reading device. To make the pick-up head closer to the outer area, the moving force applied to the pick-up head can be reduced so as to reduce the pick-up head's inertia in block 302. Hence, a second fixed force that is smaller than the first fixed force would be applied to move the pick-up head outward continuously for a second time period, so that the pick-up head would be very close to the outer area of the disc reading device, but still does not reach the outer area. Specifically, the second time period is shorter than the first time period, and the second fixed force is smaller than the first fixed force. Hence, the pick-up head's moving distance in step 302 would be smaller than the moving distance in step 301. In step 302, for example, the pick-up head may move to a position at ⅚ of the total length.

In block 303, the pick-up head moves, by means of PWM, outward by a third fixed force within a third time period, so as to move the pick-up head to the outer area of the disc reading device.

After moving for the first time period and the second time period, the pick-up head has been very close to the outer area of the disc reading device. In furthering the moving process, if the force for moving the pick-up head is large, the pick-up head could move too fast and thus, for example, may hit the periphery of the mechanism, produce an abnormal sound, and damage the disc reading device's components. To prevent such a situation, the pick-up head can be controlled by means of PWM, thus a third fixed force that is smaller than the second force would be applied to move the laser outward for a third time period. Specifically, the third time period may be relatively long. For example, the third time period may be larger than the summation of the first time period and the second time period. The third force may be relatively small. The pick-up head is moved by means of PWM, thereby ensuring that the pick-up head can move slowly for a relatively long period of time, thus infinitely nearing the outer area, without hitting the periphery of the mechanism.

The summation of the first time period, the second time period and the third time period is equal to the predetermined time period as aforementioned. Specifically, the summation of the first time period, the second time period and the third time period is equal to the predetermined time period, such that the pick-up head can accurately move to the outer area, and the moving duration would not be too long to affect the user's experience. More specifically, a preferred value of the predetermined time period is about 4 seconds to about 6 seconds.

More preferably, the predetermined time period is 4 seconds, in which the first time period is 600 ms, the second time period is 400 ms, and the third time period is 3 seconds.

Differing from the prior art, in this embodiment, the pick-up head first moves outward from the inner area of the disc reading device by a first fixed force for a first time period to ensure that it moves a relatively long distance position, and then the pick-up head moves outward by a second fixed force that is smaller than the first force for a second time period to reduce the pick-up head's inertia so that the pick-up head would be very close to the outer area of the disc reading device, and finally the pick-up head moves, by means of PWM, outward by a third fixed force that is smaller than the second fixed force for a third time period such that the pick-up head moves to the outer area of the disc reading device. The summation of the first time period, the second time period and the third time period is a reasonable predetermined time period, which can not only ensure the pick-up head moves to the outermost circle, but also not affect the user's using experience.

Figure 4:
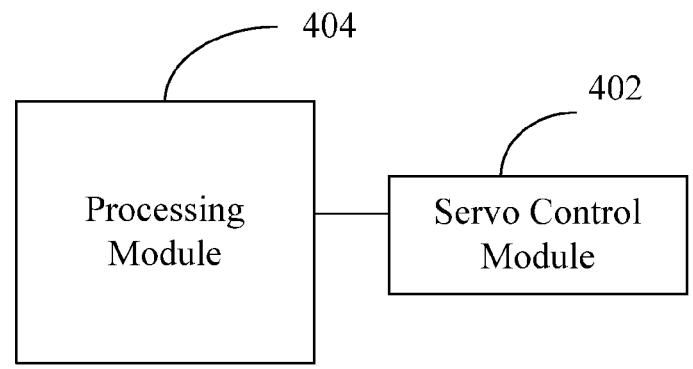
FIG. 4 is a block diagram illustrating an apparatus for detecting tightness of a pick-up head according to an embodiment of the present disclosure.

Referring now to FIG. 4, which shows a block diagram illustrating an apparatus for detecting tightness of a pick-up head according to an embodiment of the present disclosure, the apparatus comprises a servo control module 402 and a processing module 404.

The servo control module 402 is configured to move the pick-up head to an inner area of a disc reading device when the disc reading device is powered on.

Since a limit switch is disposed only at the inner area of the sliding rail, the state of the limit switch may be utilized to accurately determine whether the pick-up head has moved to the inner area. In order to accurately detect the tightness of the pick-up head, according to this embodiment, the state of the limit switch would first be utilized to accurately determine whether the pick-up head has moved to the inner area.

Figure 5:
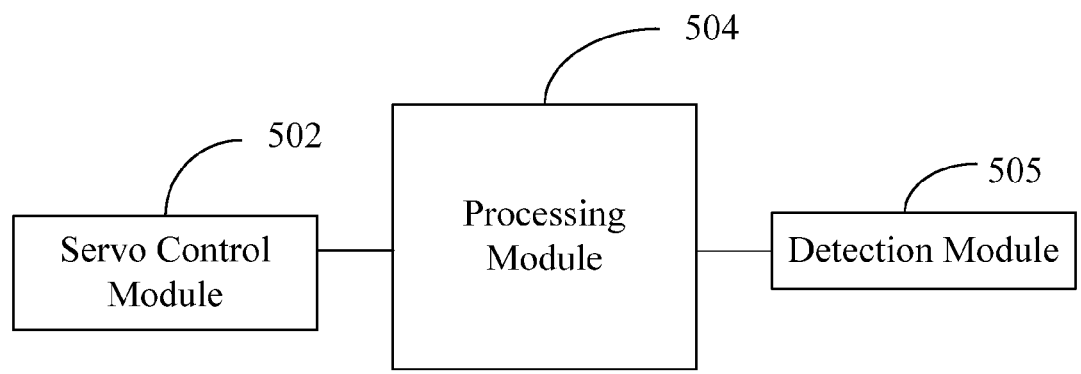
FIG. 5 is a block diagram illustrating an apparatus for detecting tightness of a pick-up head according to another embodiment of the present disclosure.

Referring now to FIG. 5, which shows a block diagram illustrating an apparatus for detecting the tightness of a pick-up head according to another embodiment of the present disclosure, the apparatus for detecting the tightness of the pick-up head not only comprises a servo control module 502 and a processing module 504 as shown in FIG. 4, but also comprises a detection module 505. The detection module 505 may be implemented by various hardware (e.g., a detector or detection circuit), software, or combination thereof. When the disc reading device is powered on, the detection module 505 may first determine whether the pick-up head is located at the inner area of the disc reading device through the state of the limit switch. Specifically, the detect module 505 detects the status of the limit switch and notifies its determination to the servo control module 502. The structure and function of the servo control module 502 and the processing module 504 as shown in FIG. 5 are identical to the structure and function of the servo control module 402 and the processing module 404.

The servo control module 402 first controls the pick-up head to move to the inner area of the disc reading device, such that the inner area of the disc reading device can be chosen as an initial position for moving the pick-up head, and the pick-up head can then accurately move to the outer area of the disc reading device in subsequent processes. More specifically, when the pick-up head does not touch the limit switch, the state of the limit switch is represented by "1", and when the pick-up head moves to the inner area and touches the limit switch, the state of the limit switch would be switched from "1" to "0". When the pick-up head is determined to be not located at the inner area by the state of the limit switch, the servo control module 402 may first control the pick-up head to move to the inner area of the disc reading device.

It should be noted that, in the above embodiment, the apparatus for detecting the tightness of the pick-up head may perform the tightness detection operations only when the disc reading device is powered on. When the disc is entering or being removed from the tray, or when the system is awakened from a sleep state to a wake-up state, or under other conditions, the above mentioned operations would not be performed.

The servo control module 402 is further configured to control the pick-up head to move to an outer area of the disc reading device within a predetermined time period.

Since the disc reading device has the limit switch only disposed at the inner area, and no other limit switch is disposed at the outer area, thus after the pick-up head first moves to the inner area of the disc reading device, a fixed predetermined time period may be set up in advance and the pick-up head then moves to the outer area of the disc reading device within the fixed predetermined time period. The predetermined time period should be sufficient enough to guarantee that the pick-up head can move from the inner area of the disc reading device to the outer area, and should not be too long to affect the user experience.

Specifically, since the outer area is not equipped with a limit switch, therefore to ensure the pick-up head can reach the outer area, the servo control module 402 may first control the pick-up head to move outward from the inner area by a second fixed force for a first time period. The second force is relatively large to ensure that the pick-up head can move along the sliding rail to a relatively long distance position to near the outer area of the disc reading device. Specifically, the product of a moving speed corresponding to the second force and the first time period (i.e., the pick-up head's moving distance) should be smaller than a total length between the inner area and the outer area of the disc reading device, but should at least be larger than half of the total length. In actual implementations, the product of the moving speed corresponding to the second force and the first time period may be configured to be ¾ of the above total length or even longer.

The servo control module 402 may then control the pick-up head move outward by a third fixed force that is smaller than the second fixed force within a second time period. Specifically, after moving for the first time period, the pick-up head would be close to the outer area of the disc reading device. To make the pick-up head closer to the outer area, the servo control module 402 may reduce the force for moving the pick-up head so as to reduce the pick-up head's inertia. Hence, a third fixed force that is smaller than the second force would be applied to move the pick-up head outward continuously for a second time period so that the pick-up head would be very close to the outer area of the disc reading device, but still does not reach the outer area at this moment. The second time period is shorter than the first time period, and the third force is smaller than the second force.

Hence, the pick-up head's moving distance during the second time period would be smaller than the moving distance during the first time period. For example, after the first time period and the second time period, the pick-up head may move to a position at ⅚ of the total length.

After moving for the first time period and the second time period, the pick-up head has been very close to the outer area of the disc reading device. In furthering the moving process, if the force for the pick-up head is too large, the pick-up head could move too fast and thus, for example, may hit the periphery of the mechanism, produce an abnormal sound, and damage the disc reading device's components. Thus the servo control module 402 may control, by means of PWM, the pick-up head to move outward by a fourth fixed force that is smaller than the third fixed force within a third time period.

The summation of the first time period, the second time period and the third time period is equal to the aforementioned predetermined time period. Specifically, after a large number of experiments and practices, the predetermined time period is preferred to be about 4 seconds to about 6 seconds, such that the pick-up head can accurately move to the outer area, and also the moving duration would not be too long to affect the user's experience.

More preferably, the predetermined time period is 4 seconds, in which the first time period is 600 ms, the second time period is 400 ms, and the third time period is 3 seconds.

The servo control module 402 is further configured to control the pick-up head to move uniformly from the outer area of the disc reading device to the inner area by a first fixed force.

When the servo control module 402 has controlled the pick-up head to move the outer area of the disc reading device within the predetermined time period, the servo control module 402 then would apply a first fixed force to control the pick-up head to move at a constant speed from the outer area of the disc reading device to the inner area, and the limit switch disposed at the inner area may further be utilized to determine whether the pick-up head has reached the inner area position, and the moving duration in which the pick-up head uniformly moves from the outer area to the inner area will be recorded accordingly.

The processing module 404 is configured to record the moving duration for moving the pick-up head uniformly from the outer area of the disc reading device to the inner area.

Specifically, the processing module 404 may start a timer to record the moving duration for moving the pick-up head uniformly from the outer area of the disc reading device to the inner area. For example, the timer may count once every 20 ms until the state of the limit switch indicates that the pick-up head has moved to the inner area of the disc reading device. The timer's fixed time interval for counting may be, for example, 20 ms, 10 ms or 30 ms, and is not limited herein.

Further, the processing module 404 may, after acquiring the moving duration for moving the pick-up head uniformly from the outer area of the disc reading device to the inner area, compare the recorded moving duration against a standard time initially set up by the disc reading device. Typically, to simplify the calculation complexity, the fixed time intervals used by the timer may be equal to the time intervals that are used by the disc reading device for initially setting the above mentioned standard time. Specifically, the standard time set by the disc reading device refers to the time required for moving the pick-up head from the outer area to the inner area (or, from the inner area to the outer area) by a standard force that is initially set by the disc reading device and used for moving the pick-up head during disc reading.

The processing module 404 may, after acquiring the current tightness of the pick-up head, calculate the current tightness rate based on the moving duration recorded by the timer and the standard time, so as to adjust the force for moving the pick-up head based on the acquired tightness degree. The tightness rate is a ratio of the moving duration recorded by the timer to the standard time. Further, in practical implementations, the ratio is generally a very small value. Hence in the current embodiment, to reduce error, the recorded moving duration may first be enlarged a certain times and then compared to the initial standard time to calculate the tightness rate. When adjusting the force of the pick-up head based on the calculated tightness rate, the adjusted force may be reduced by a certain times. Specifically, in the current embodiment the recorded moving duration will be enlarged by 8 times for example. The ratio of the recorded moving duration enlarged by 8 times to the initial standard time would be taken as the tightness rate, as is shown in the following equation:

Tightness rate=(Moving duration*8)/Standard time.

After the tightness rate is acquired, the force for moving the pick-up head will be adjusted based on the tightness rate. The force for moving the pick-up head is the product of the initial reference force (i.e., the standard force) and the tightness rate, as shown in the following equation:

Adjusted force=(Standard force*Tightness rate)/8.

The recorded moving duration is enlarged by 8 times for calculating the tightness rate, namely, the current tightness rate is 8 times of the actual tightness rate. Therefore, the adjusted force obtained based on the above equation will be narrowed by 8 times so as to acquire the actual force for moving the pick-up head.

In other embodiments, other parameters can also be utilized to reduce error, and is not limited herein.

Differing from the previous embodiment, the processing module of the current embodiment may, after detecting the tightness degree of the pick-up head based on the recorded moving duration, further adjust the force for moving the pick-up head so as to improve the matching degree of the moving force and the actual tightness rate, thus making the disc reading function more accurate and enhancing the user experience.

According to another embodiment, the apparatus for controlling the moving of the pick-up head can comprise a servo control module.

The servo control module is first configured to control the pick-up head to move outward from an inner area of a disc reading device by a first fixed force within a first time period.

Since a limit switch is disposed only at the inner area of the sliding rail, and not disposed at the outer area, it thus cannot be determined whether the pick-up head is located at the outer area of the disc reading device. Hence in the current embodiment, the inner area of the disc reading device will be chosen as the initial position for moving the laser head. More specifically, when the pick-up head does not reach the limit switch, the state of the limit switch is represented by "1", and when the pick-up head reaches the limit switch (that is, the pick-up head moves to the inner area), the state of the limit switch would be switched from "1" to "0".

When having determined that the pick-up head is positioned at the inner area of the disc reading device, the servo control module may first control the pick-up head to move outward from the inner area by a first fixed force for a first time period. The first force is relatively large to ensure that the pick-up head can move along the sliding rail to a relatively long distance position to near the outer area of the disc reading device. The product of a moving speed corresponding to the first force and the first time period (i.e., the pick-up head's moving distance during the first time period) should be smaller than a total length between the inner area of the disc reading device and the outer area, but should at least be larger than half of the total length. In actual implementations, the product of the moving speed corresponding to the first force and the first time period may be configured to be ¾ of the total length or even longer.

The servo control module is further configured to control the pick-up head to move outward by a second fixed force within a second time period.

After moving for the first time period, the pick-up head is close to the outer area of the disc reading device. To make the pick-up head closer to the outer area, the servo control module may reduce the force for moving the pick-up head (so as to reduce the pick-up head's inertia) in the second time period. Hence, the second fixed force that is smaller than the first force would be applied to move the pick-up head outward continuously for the second time period, so that the pick-up head would be very close to the outer area of the disc reading device, but still does not reach the outer area at this moment. Specifically, the second time period is shorter than the first time period, and the second force is smaller than the first force. Therefore, the moving distance of the pick-up head during the second time period is far smaller than the moving distance of the pick-up head during the first time period. In this embodiment, for example, the servo control module may control the pick-up head to move to a position at ⅚ of the total length after the second time period and the first time period.

The servo control module is further configured to control, by means of PWM, the pick-up head to move outward by a third fixed force that is smaller than the second force within a third time period, so as to move the pick-up head to the outer area of the disc reading device.

After moving for the first time period and the second time period, the pick-up head has been very close to the outer area of the disc reading device. In furthering moving process, if the force of the pick-up head is large, the pick-up head would move too fast and thus might hit the periphery of the mechanism, produce an abnormal sound, thus damage the disc reading device's components and bring noises to the user. To prevent such situation, the servo control module may control the pick-up head by means of PWM, and thus apply a third fixed force that is smaller than the second force to move the pick-up head outward for a third time period. More specifically, the third time period may be relatively longer (for example, the third time period may be longer than the summation of the first time period and the second time period), and the third force would be smaller. Since the pick-up head is moved by means of PWM in the third time period, thus ensuring the pick-up head moving slowly for a relatively long period of time so as to infinitely near the outer area, without hitting the periphery of the mechanism.

The summation of the first time period, the second time period and the third time period is equal to the aforementioned predetermined time period, such that the pick-up head can be controlled to move to the outer area and the moving duration required would not be too long to affect the user's experience. More specifically, a preferred value of the predetermined time period is about 4 seconds to about 6 seconds.

More preferably, the predetermined time period is 4 seconds, in which the first time period is 600 ms, the second time period is 400 ms, and the third time period is 3 seconds.

Differing from the prior art, the servo control module according to the current embodiment first controls the pick-up head to move outward from the inner area of the disc reading device by a first fixed force for a first time period so as to ensure the pick-up head moves to a relatively long distance position, the servo control module further controls the pick-up head to move outward with a second fixed force that is smaller than the first fixed force for a second time period, and then the servo control module controls the pick-up head to move outward by a third fixed force that is smaller than the second fixed force for a third time period such that the pick-up head moves to the outer area of the disc reading device. The summation of the first time period, the second time period and the third time period is a reasonable predetermined time period, which can not only ensure the pick-up head to move to the outer area, but also not affect the user's using experience.

The servo control module may be a servo controller or a servo control circuit and may be implemented by a controller or microcontroller, etc., and the processing module may be implemented by a processor, microprocessor, Application Specific Integrated Circuit (ASIC) or a digital signal processor, etc.

What is described above is merely embodiments of the present disclosure, thus shouldn't be construed to be limiting the patent scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A method for detecting tightness of a pick-up head, comprising:
    moving the pick-up head to an inner area of a disc reading device when the disc reading device is powered on;
    moving the pick-up head from the inner area to an outer area of the disc reading device within a predetermined time period; and
    moving the pick-up head from the outer area of the disc reading device to the inner area at a constant speed by a first fixed force, and recording a moving duration for moving the pick-up head from the outer area of the disc reading device to the inner area at the constant speed.

2. The method according to claim 1, wherein the step of moving the pick-up head to the inner area of the disc reading device comprises:
    determining whether the pick-up head is positioned at the inner area of the disc reading device through a limit switch disposed at the inner area.

3. The method according to claim 1, wherein the step of moving the pick-up head to the outer area of the disc reading device within the predetermined time period comprises:
    controlling the pick-up head to move outward continuously by a second fixed force within a first time period;
    controlling the pick-up head to move outward continuously by a third fixed force within a second time period, wherein the third fixed force is smaller than the second fixed force; and
    controlling, by means of pulse width modulation, the pick-up head to move outward continuously to the outer area of the disc reading device by a fourth fixed force within a third time period—wherein the fourth fixed force is smaller than the third fixed force, wherein a summation of the first time period, the second time period and the third time period equals the predetermined time period.

4. The method according to claim 3, wherein controlling the pick-up head to move outward continuously by the second fixed force within the first time period comprises controlling the pick-up head by the second fixed force to move towards the outer area for at least half of a distance between the inner area and the outer area; and controlling the pick-up head to move outward continuously by the third fixed force within the second time period comprises controlling the pick-up head by the third fixed force to move to a position close to the outer area within the second time period.

5. The method according to claim 3, wherein the predetermined time period is 4 seconds to 6 seconds.

6. The method according to claim 5, wherein the predetermined time period is 4 seconds, the first time period is 600 milliseconds (ms), the second time period is 400 ms, and the third time period is 3 seconds.

7. The method according to claim 1, further comprising:
comparing the recorded moving duration with a standard time initially set up by the disc reading device, and adjusting a force for moving the pick-up head during disc reading based on the comparison, wherein the standard time initially set up by the disc reading device is the time required for controlling the pick-up head to complete a full travel between the outer area and the inner area by a standard force initially set up by the disc reading device for moving the pick-up heading during disc reading.

8. The method according to claim 7, wherein the step of adjusting the force for moving the pick-up head during disc reading based on the comparison result comprises:
adjusting the force for moving the pick-up head based on the following equation:

Adjusted force=Standard force*Tightness rate;

wherein the adjusted force is the force adjusted for controlling the pick-up head to move during disc reading, the standard force is a reference force initially set up by the disc reading device for moving the pick-up head during disc reading, and the tightness rate is a ratio of the moving duration to the standard time.

9. A method for controlling the moving of a pick-up head, comprising:
moving, by a disc reading device, the pick-up head outward from an inner area of the disc reading device by a first fixed force within a first time period;
moving the pick-up head outward by a second fixed force within a second time period, wherein the second fixed force is smaller than the first fixed force; and
moving, by means of pulse width modulation, the pick-up head outward to the outer area of the disc reading device by a third fixed force within a third time period, wherein the third fixed force is smaller than the second fixed force;
wherein a summation of the first time period, the second time period and the third time period is equal to a predetermined time period.

10. The method according to claim 9, wherein the step of moving by the disc reading device the pick-up head outward from the inner area of the disc reading device by the first fixed force within the first time period comprises:

controlling the pick-up head to move towards the outer area by the first fixed force within the first time period for at least half of a distance between the inner area and the outer area.

11. The method according to claim 9, wherein the step of moving the pick-up head outward by the second force within the second time period comprises:
controlling the pick-up head to move to a position close to the outer area by the second fixed force within the second time period.

12. The method according to claim 9, wherein the predetermined time period is 4 seconds to 6 seconds.

13. The method according to claim 12, wherein the predetermined time period is 4 seconds, the first time period is 600 ms, the second time period is 400 ms, and the third time period is 3 seconds.

14. An apparatus for detecting tightness of a laser head, the apparatus comprises a servo control module and a processing module,
wherein the servo control module is configured to move the pick-up head to an inner area of a disc reading device when the disc reading device is powered on, and move the pick-up head from the inner area to an outer area of the disc reading device within a predetermined time period, and further move the pick-up head from the outer area of the disc reading device to the inner area at a constant speed by a first fixed force; and
the processing module is configured to record a moving duration for moving the pick-up head from the outer area of the disc reading device to the inner area at the constant speed.

15. The apparatus according to claim 14, wherein the servo control module is further configured to determine whether the pick-up head is positioned at the inner area of the disc reading device through a limit switch disposed at the inner area.

16. The apparatus according to claim 14, wherein the servo control module is configured to move the pick-up head outward by a second fixed force within a first time period, and move the pick-up head outward by a third fixed force within a second time period, and further move, by means of pulse width modulation, the pick-up head outward by a fourth fixed force within a third time period, such that the pick-up head moves to the outer area of the disc reading device, wherein the third fixed force is smaller than the second fixed force and the fourth fixed force is smaller than the third fixed force;
wherein a summation of the first time period, the second time period and the third time period is equal to the predetermined time period.

17. The apparatus according to claim 16, wherein the servo control module is configured to move the pick-up head by the second force towards the outer area within the first time period for at least half of a distance between the inner area and the outer area, and move the pick-up head by the third force to a position close to the outer area within the second time period.

18. The apparatus according to claim 16, wherein the predetermined time period is 4 seconds to 6 seconds.

19. The apparatus according to claim 14, wherein the processing module is further configured to compare the recorded moving duration with an initial standard time previously set up by the disc reading device, and adjust a force for moving the pick-up head during disc reading based on the comparison result, wherein the initial standard time of the disc reading device is the time required for controlling the pick-up head to complete a full travel between the outer area and the inner area by a standard force initially set up by the disc reading device for moving the pick-up head during disc reading.

20. The apparatus according to claim 19, wherein the processing module is further configured to adjust the force for moving the pick-up head during disc reading based on the following equation:

Adjusted force=Standard force*Tightness rate;

wherein the adjusted force is the force adjusted for controlling the pick-up head to move during disc reading, the standard force is a reference force initially set up by the disc reading device for moving the pick-up head during disc reading, and the tightness rate is a ratio of the moving duration to the initial standard time.

* * * * *